United States Patent Office 3,337,180
Patented Aug. 22, 1967

3,337,180
VALVE
William W. Carlton, 158 Ipswich Road,
Topsfield, Mass. 01983
Filed July 19, 1963, Ser. No. 296,187
10 Claims. (Cl. 251—121)

This invention relates to valves and more particularly to a new and improved throttling valve for controlling the flow and dissipation of flow energy of fluid from a high pressure source thereof.

Some valves are employed to dissipate more or less flow energy in order to regulate flow rate or pressure, thus controlling the flow conditions. Generally a simple adjustable restriction is placed in the path of the fluid flow, such as a reduced open cross-sectional flow area. In a globe valve, for example, a round disc is progressively moved toward a round opening until it seats tightly for no flow. The high velocity imparted normally in throttling by means of a single step or restriction, gives rise to undesirable side effects, for example, noise generation and high wear due to high velocity. Also, instability in the fluid flow may cause oscillations of the mechanical parts. Cavitation may be produced when liquid vapor pressures are approached. Additionally, in a single step or restriction, the restriction area must be made quite small to significantly limit flow thereby resulting in poor sensitivity of control.

Improvement over such single restriction valves is disclosed in U.S. Patents 1,919,232 and 1,919,233. Patent 1,919,232 shows an expansible fluid valve in which expansion chambers are provided either in the movable member or the stationary member of the valve. The walls of the expansion chambers are disclosed as being of a streamlined curvilinear design. U.S. Patent 1,919,233 is similar to U.S. Patent 1,919,232, the primary difference being that expansion chambers are provided in both the movable member and the stationary member of the valve. The chambers are of a streamlined curvilinear design.

Accordingly the main object of the present invention is to provide a valve which is an improvement over such prior art valves.

Another object of the present invention is to provide improved distributed reduction of pressure in a single valve having a series of pressure reduction stages.

Another object of the present invention is to provide increased dissipation of velocity in each stage by providing maximum catching or recirculating of passing flow.

Another object of the present invention is to provide an improved construction of a throttling valve whereby pressure reduction is accomplished with silent throttling over a wide range of adjustment to sealing closure.

Other objects of the invention will in part be obvious and will in part appear hereinafter.

The invention accordingly comprises the apparatus possessing the construction, combination of elements and arrangement of parts which are exemplified in the following detailed disclosure and the scope of the application of which will be indicated in the claims.

For a fuller understanding of the nature and objects of this invention, reference should be had to the following detailed description taken in connection with the accompanying drawings wherein.

Figure 1:
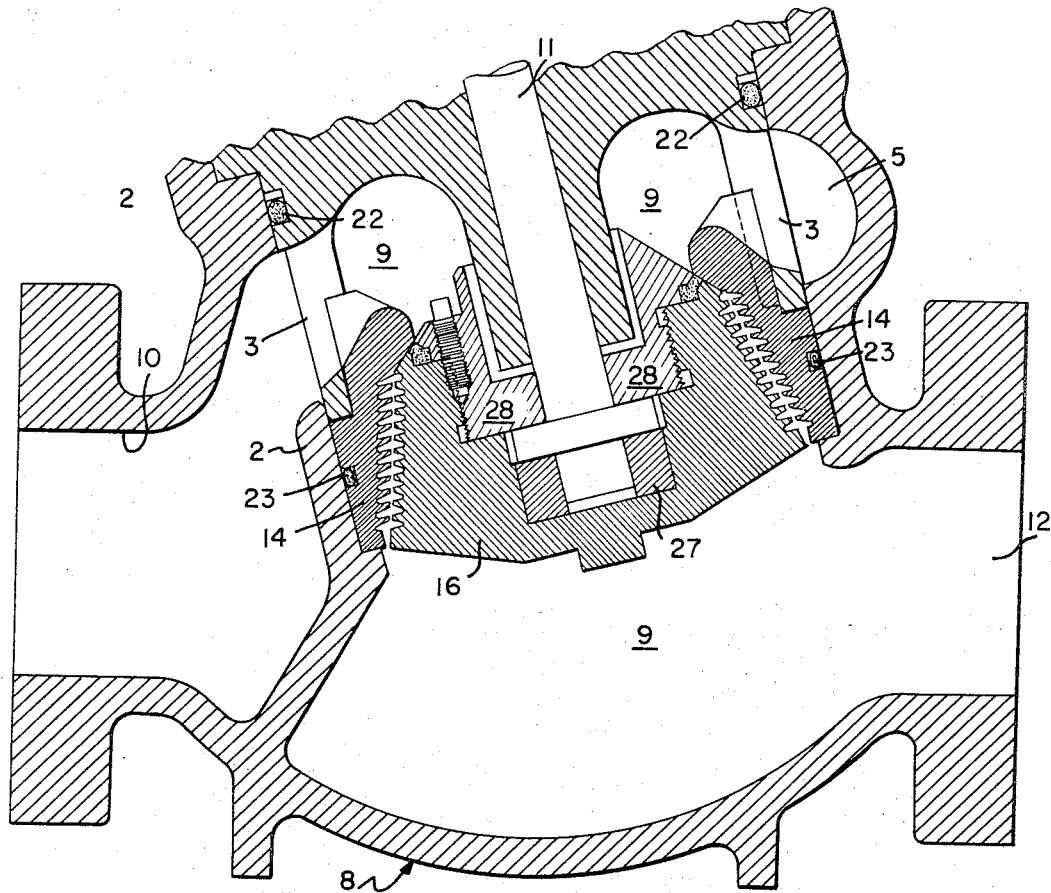
FIGURE 1 is a fragmentary cross-sectional view of a preferred embodiment of the present invention as applied to a globe valve.

In accordance with the present invention there is provided an improved valve providing improved distributed or multiple loss of pressure in a single valve element whereby lower local velocities and lower kinetic energy or dissipation of each stage of reduction is achieved than heretofore obtainable.

In a preferred embodiment of the present invention the valve comprises an adjustable plug having a tapered, generally conical shape, coaxially disposed within a relatively fixed member having an inner surface conforming in shape to the plug. The portion of least circumference of the tapered plug is positioned adjacent the inlet of the valve, and the portion of greatest circumference positioned adjacent the outlet of the valve whereby fluid passing from the inlet to the outlet of the valve passes from lesser to the greater circumference of the plug. Disposed about the tapered plug and the inner surface of the fixed member is a plurality of spaced tapered fins which provide a plurality of tapered grooves between adjacent fins. The valve is provided with a separate seat to provide tight shut-off in the closed position. In a preferred embodiment of the present invention the seat area is made relatively large and at a flatter angle or slope than the slope of the distal ends of the fins on the tapered plug.

In accordance with the present invention, it has been discovered that the tapered configuration of the plug and coacting fixed member, the tapered fins and grooves in addition to the separate seat provide, among other advantages, improved high pressure drop, silent throttling, and low wear due to resultant lower local velocities not heretofore obtainable in prior art valves.

The straight tapered plug and matching fixed member provide substantially equal gaps between opposing fins giving a series of equivalent restrictions. This even distribution results in lower maximum velocities holding local energy dissipation to a minimum. This is an important feature in achieving silent throttling and reduced erosion.

Even when opposing fins are not directly opposite, the flow is accelerated around each tapered fin resulting in increased recirculating vortices being caught in each tapered groove.

In a preferred embodiment of the present invention the fin ends are angularly inclined to the flow path. In this manner fluid flow is directed away from the next opening between fin ends and into the succeeding groove thereby increasing the catching and recirculating capacity of each groove whereby increased distributed pressure reduction is obtained over a wide range of valve positions to tight shut-off.

The increasing flow area of the tapered plug provides advantage in that the center of the fluid stream is not accelerated to a velocity substantially in excess of the velocity at the first step due to the increased flow area occupied by the lower velocity flow at the sides of the stream in passing from the inlet to the outlet of the valve.

The tapered fins and deep grooves, in addition to providing strength and machining ease, provide more turbulent loss to the recirculated velocity than shallow, streamlined or curvilinear chambers which allow recirculated flow to retain high velocity. Shallow streamlined or curvilinear chambers produce one vortex which allows flow to rotate in the chamber so that highest effective dissipation of velocity is not achieved. In accordance with the present invention such disadvantages are overcome.

In accordance with the present invention it has also been discovered that the depth of the fins or grooves, defined by adjacent fins, must bear a certain specific relationship to the distance between adjacent fin ends and to the flow passage when the valve is fully opened as will be described in detail hereinatfer.

Referring now to FIGURE 1 of the drawing, my valve comprises a valve casing 8 having an inlet port 10 and an outlet port 12. Disposed within the casing 8 is a valve assembly which may be inclined at an angle of up to about 45° to the vertical to allow for greater flow areas. Fluid entering the valve passes through inlet port 10 and into the valve assembly through a series of flow ports formed by struts 3 which are circumferentially disposed thereabout. Preferably, the fluid is allowed to flow about the entire periphery of the valve assembly and into the flow ports by means of a bulbous flow passage 5 thereby enabling even distribution over the entire unit.

After passing through the valve assembly, the fluid moves to the globus section disposed therebeneath and out of the valve casing through outlet port 12.

The entire valve assembly is removable from the casing by lifting it upwardly. In this manner, individual parts in the assembly may be worked upon or replaced easily without difficulty. Not only may the plug be removed by such upward lifting, but also so may the cooperating sleeve 14 and other elements. Furthermore the assembly is interchangeable with similar assemblies and the valve need be rendered inoperative to change parts only for a time sufficient to interchange assemblies.

Any conventional means may be utilized to seal the valve assembly into the valve casing. For example, a threaded head having an axially disposed aperture for the valve stem can be easily screwed onto the valve casing 8. As a further seal, I prefer to dispose O-rings 22 and 23 about the sides of the valve assembly to prevent the outward seepage of fluid. The O-rings may be formed of any conventional gasketing material including rubber, neoprene and vinyls.

While the valve assembly is preferably cylindrical because this shape lends itself to most rapid and easy interchange with other assemblies, it is apparent that many other peripheral configurations may also be used. For example, a square, rectangular or other similar shape may be substituted, however in these cases the advantage of being able to turn the entire assembly to dislodge it from the casing for maintenance work is lost.

In the valve assembly, the plug 16 moves axially within the sleeve 14 which is retained by member 7. The fluid passes from bulbous channel 5 into the ports formed by struts 3 and thence into a cavity 9. The cavity 9 surrounds a threaded valve stem 11 upon which plug 16 is removably supported. When the fluid enters between the struts 3, it flows upon the plug 16 and thence between sleeve 14 and plug 16 when the valve is open.

Preferably, I support the plug 16 upon the valve stem 11 by an outwardly extending flange 24. In turn, plug 16 is screwed onto a retaining ring 28 and when set screw 25 is disposed on an aperture drilled in the mating threads, rigid attachment is attained. Preferably, a pliant gasket 27 is disposed between flange 24 and the lower portion of plug 16 so that a good fit can be realized.

As I have indicated previously, my invention is oriented about the discovery that flow pressure can be dissipated over a series of steps in a single valve element. The series of steps results in a sequential dissipation or energy loss so that turbulence resulting from a single pressure drop, such as occurs in conventional globe valves, is eliminated. Since the flow of fluid is over a conically shaped plug having a series of flow dissipation zones formed by a pair of adjacent fins and since the volume of each of these zones continually increases, the flow pressure is reduced gradually and no massive drops occur at any one time. Such gradual reduction is very important to effect lower local velocities, smaller-scale turbulence, reducing wear and noise from the total energy dissipation process. In addition, cavitation, the formation of bubbles or vapor pockets due to large pressure reductions, will not be produced.

In particular, by the design of a series of fins surrounding the plug 16 and within the sleeve 14, I can effectively throttle the fluid passing therebetween by using a series of velocity reduction zones and thus substantially reduce or eliminate noise and erosion. In this manner the pressure drop is divided into a number of small steps, each having its own small amount of turbulence. Since the tapered grooves defined by the fins are of substantial depth relative to the flow area, they are effective when the fins on the plug 16 are not directly opposing the fins on the sleeve 14. The stream is accelerated around each fin in the flow passage and a sizable recirculatory vortex is caught in each groove. This is further aided by directing the stream in the flow passage away from the next opening and towards the next fin by using a suitable angle on the end thereof. In addition, in order to attain reasonably quiet operation I have found that the depth of the fins must bear certain specific relationships to the distance between adjacent fins and to the flow passage when open fully.

Figure 3:
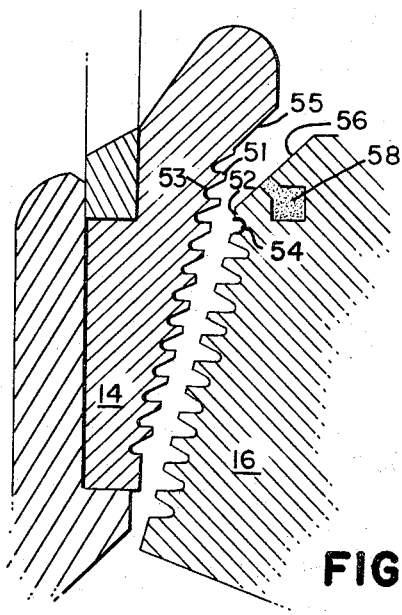
FIGURE 3 is an enlarged fragmentary cross-sectional view similar to FIGURE 2 showing the valve partially open.

To keep the loss steps nearly equal to insure better distribution of the loss of energy, the flow of fluid is passed from the narrow to the wide end of the plug. When partially open, the first restriction between opposing (or nearly opposing) fins will cause a substantially uniform maximum local velocity across the width of the stream as shown in FIGURE 3 between fin 51 and the bottom edge of sealing disc 52 (which can be considered another fin for the purpose). Immediately following, the fluid will slow down as the sides of the flow pass into grooves 53 and 54. This effect will be repeated again and again further down stream so that the sides of the flow will be slowed more and more. I have discovered that this reduction in flow velocity at the sides requires increased flow area to prevent excess velocity of the fluid in the center of the flow path. This additional flow area down stream is provided in accordance with the present invention by the increasing circumference of the tapered plug 16.

In view of the greater efficiency and increased catching capacity of the grooves of the present invention with resultant greater increased dissipation of the kinetic energy of the recirculating flow, it is apparent that greater pressure reduction is achieved with wider flow passages. Thus, with lesser flow passages, only one or two steps may be necessary in order to achieve the desired pressure reduction. Accordingly, one or more steps may be provided depending on the flow passage and the pressure reduction required.

The occurrence of cavitation is reduced or prevented as a result of lower local velocities. However, should cavitation tend to form from the fluid approaching liquid vapor pressures, for example, the resulting increased volume of flow due to the bubbles would accelerate flow velocities downstream. But with additional loss steps downstream, a sizable backpressure would form thereby constraining such acceleration thereby minimizing or eliminating the cavitation. Bubbles formed at the lowermost end of the plug 16 would not upset the flow regulation since they would not be within the limited flow areas of the throttling zone (the one between opposing fins), but rather in the larger receiving chamber 9.

When the valve is open further, the flow passage becomes wider and hence will permit the passage of more fluid. The fins disposed at either side of the flow passage, however, will continue to catch the outer portions of the stream and reduce the flow pressure. The upper surfaces of the fins 60 (see FIGURES 3, 4, and 5) are preferably disposed at an angle which is no more than perpendicular to the axis of the plug. Hence the upper surfaces are flat (with respect to the axis of the plug 16) or inclined towards the direction of flow to catch the fluid passing therethrough. The lower surface of the fins 62 are tapered upwardly to impart strength to the structure and provide a straight or linear surface. For adequate control of flow and minimization of noise, I have discovered that the grooves should be as deep as possible. However, as a practical limit the height of the inside ends of the grooves (measured at a point A when they become accurate) should be about one-third to one-quarter of the spacing between the distal ends of the fins measured at a point B. Furthermore, the distal ends of adjacent fins on both the sleeve 14 and plug 16 should be spaced from each other by a distance equal to about one-half to twice the depth of the grooves C. Moreover, the depth of the grooves C formed by adjacent fins should be at least about one-half the width of the flow passage when the valve is open fully.

Figure 2:
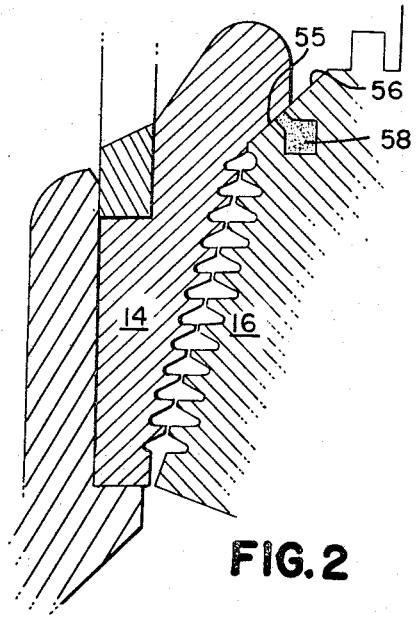
FIGURE 2 is an enlarged fragmentary cross-sectional view showing the coacting plug and sleeve having fins disposed thereon.
Figure 4:
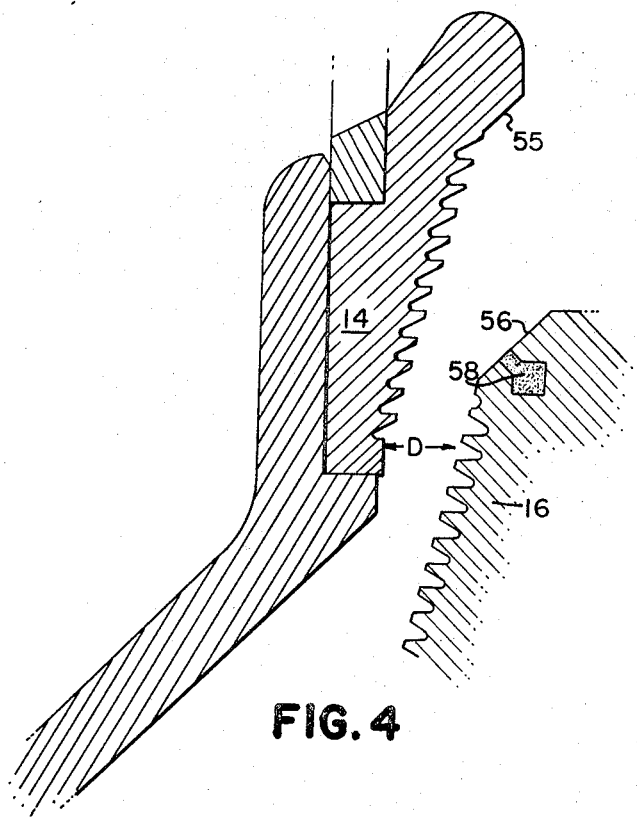
FIGURE 4 is a view similar to FIGURE 2 showing the valve in fully opened position.

When retracting the plug from the fully open position as shown in FIGURE 4 to the closed position as shown in FIGURE 2, the flow passage O will be gradually restricted until just before shut off and then the distance between flange 55 and seat 56 will become less than the width of the flow passage D. Hence due to the shift of the minimum distance from the flow passage to the seat area most of the pressure drop will be shifted there also. The shift takes place because I dispose the flange 55 and the seat 56 at an angle of 10° to 90° (with respect to the axis of the plug 16) and preferably 20° to 40°, whereas the flange 55 and seat 56 are tapered at an angle of 10° to 40° greater. In order to have mating surfaces, the distal ends of the fins on the sleeve 14 and the plug 16 together with the surfaces of the seat 56 and the flange 55 should be inclined at similar angles. Preferably there is provided a small clearance between the peripheral edges of the fins on plug 16 and on the sleeve 14 so that they will not rub against each other and wear off the sharpness.

Usually I prefer to dispose a gasket 58 on the plug 16, although it may be placed on sleeve 14 equally well, to insure a tight seal. When desired, the gasket may extend slightly beyond the surface of the member on which it is placed to obtain even greater sealing. Any of the conventional materials may be used.

Although I have shown in the seat area a fairly wide seat 56 and flange 55, this arrangement is not critical. The seat area may be shortened appreciably and the seat 56 may even be made tapered so that the sharp edge will bite into the flange 55. This latter arrangement is not too desirable, however, since the biting tends to tear the flange 55 and necessitate its early replacement.

I feel that it is important to point out that my valve is operable in all relative positions between opposing fins on the sleeve 16 and the seat 14. In any position recirculating losses on the edges of the stream passing through the flow passage will reduce flow pressures. When the valve is wide open, a very low overall pressure drop occurs.

Figure 5:
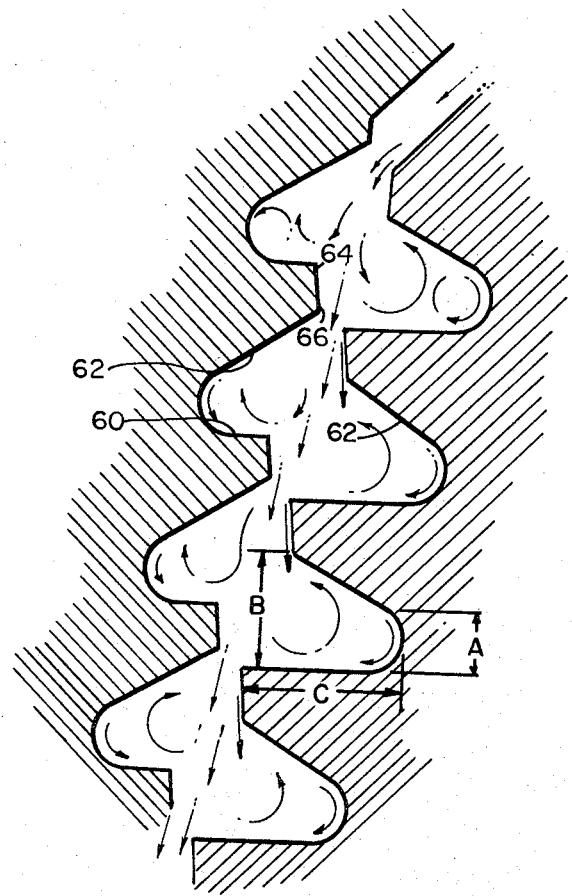
FIGURE 5 is an enlarged fragmentary cross-sectional view showing the coacting plug and sleeve in partially opened position, the fins and grooves formed by adjacent fins together with arrows illustrating the flow pattern of fluid between the fins.

As shown in FIGURE 5, the walls 60, 62 of the grooves between successive adjacent fins are unstreamlined in outline and have straight or linear runs in and out which prevent a single round vortex. The tapered deep grooves with sharp corners and straight runs in and out provide inner and outer vortices which dissipate the velocity or kinetic energy of the recirculating flow. Additionally, multiple smaller vortices provide more shear loss due to higher rotational speed and shear rate. In contrast a single round vortex as produced in streamlined curvilinear shaped chambers permit a flow path around the rotating vortex dissipating little of the recirculating velocity or kinetic energy.

Furthermore each fin end 64 to 66 is preferably angularly inclined to the flow path to provide further increased catching and recirculating capacity for each groove to provide maximum catching of each groove.

As has been explained, the depths of the grooves must bear certain relationship to the distance between adjacent fin ends and to the flow passage when fully opened. By employing these relationships the valve of the present invention can be scaled up or down to provide valves of various sizes.

Since certain changes may be made in the above apparatus and process without departing from the scope of the invention herein involved, it is intended that all matter contained in the above description or shown in the accompanying drawings shall be interpreted as illustrative and not in a limiting sense.

What is claimed is:

1. A valve comprising a fixed part and a tapered adjustable part, said tapered adjustable part being disposed in register with a tapered sleeve supported within said fixed part, a plurality of spaced tapered fins disposed on each of said sleeve and said adjustable part, the circumference of the edges of all of said fins increasing from the inlet side of said valve to the outlet side thereof, the upper and lower surfaces of each of said fins being substantially linear and the lower surface of said fins being angularly disposed relative to said upper surface, the edges of said fins defining a flow passage when said valve is open.

2. A valve comprising a fixed part and a tapered adjustable part, said tapered adjustable part being disposed in register within said fixed part, a plurality of spaced tapered fins disposed on said fixed part and said adjustable part, said fixed part and said adjustable part forming a flow passage between them when said valve is open, the spaces defined by adjacent fins on each of said parts diverging toward said flow passage, the depths of said spaces from the edges of said fins being at least one-half the width of said flow passage when said valve is fully open whereby fluid impinging on said fins is deflected into said spaces providing a series of increasing fluid pressure drops from said inlet to said outlet.

3. A valve comprising a fixed part and a tapered adjustable part, said tapered adjustable part being disposed in register within said fixed part, a plurality of spaced tapered fins disposed on said fixed part and said adjustable part, said fixed part and said adjustable part forming a flow passage between them when said valve is open, the upper and lower surfaces of adjacent fins on each of said parts being linear and defining a plurality of tapered grooves on each of said parts, each of said grooves defining a pressure reduction zone, the inner groove width being at least one-fourth the outer groove width.

4. A valve comprising a fixed part and a tapered adjustable part, said tapered adjustable part being disposed in register within said fixed part, a plurality of spaced tapered fins disposed on each of said fixed part and said adjustable part, said fixed part and said adjustable part forming a flow passage between them when said valve is open, the upper and lower surfaces of adjacent fins on each of said parts defining a plurality of tapered grooves, each of said grooves defining a pressure reduction zone, the depth of said tapered grooves being between one-half to two times the distance between the edges of adjacent fins.

5. A valve comprising a fixed part and a tapered adjustable part, said tapered adjustable part being disposed in register with a sleeve, said tapered adjustable part having its end of smallest diameter nearest to the inlet of said valve; a plurality of spaced, tapered fins disposed upon each of said fixed part and said adjustable part; a valve seat disposed upon said adjustable part nearest to said inlet and a cooperating flange disposed upon said sleeve, said flange and said seat each being arranged at a substantially similar angular relationship to each other, the slope of said valve seat being substantially greater than the slope of the distal ends of said fins, the upper and lower surfaces of each of said fins being linear and the lower surface of said fins being angularly disposed relative to said upper surface, the edges of said fins defining a flow passage when said valve is open.

6. A valve comprising a fixed part and a tapered adjustable part, said tapered adjustable part being disposed in register with a sleeve, said tapered adjustable part having its end of smallest diameter nearest to the inlet of said valve; a plurality of spaced, tapered fins disposed upon each of said fixed part and said adjustable part; a valve seat disposed upon said adjustable part nearest to said inlet and a cooperating flange disposed upon said sleeve, said flange and said seat each being arranged at a substantially similar angular relationship to each other, the upper and lower surfaces of each of said fins being linear, the depths of said spaces from the edges of said fins being at least one-half the width of said flow passage when said valve is fully open, whereby fluid impinging on said fins is deflected into said spaces providing a series of increasing fluid pressure drops from said inlet to said outlet.

7. A valve comprising a fixed part and a tapered adjustable part, said tapered adjustable part being disposed in register with a sleeve, said tapered adjustable part having its end of smallest diameter nearest to the inlet of said valve; a plurality of spaced, tapered fins disposed upon each of said fixed part and said adjustable part; a valve seat disposed upon said adjustable part nearest to said inlet and a cooperating flange disposed upon said sleeve, said flange and said seat each being arranged at a substantially similar angular relationship to each other, the upper and lower surfaces of adjacent fins on each of said parts being linear and defining a plurality of tapered grooves, each of said grooves defining a pressure reduction zone, the inner groove width being at least one-fourth the outer groove width.

8. A valve comprising a fixed part and a tapered adjustable part, said tapered adjustable part being disposed in register with a sleeve, said tapered adjustable part having its end of smallest diameter nearest to the inlet of said valve; a plurality of spaced, tapered fins disposed upon each of said fixed part and said adjustable part; a valve seat disposed upon said adjustable part nearest to said inlet and a cooperating flange disposed upon said sleeve, said flange and said seat each being arranged at a substantially similar angular relationship to each other, the upper and lower surfaces of adjacent fins on each of said parts defining a plurality of tapered grooves, each of said grooves defining a flow reduction zone, the depth of said tapered grooves being between about one-half to two times the distance between the edges of adjacent fins.

9. In a valve having an inlet and an outlet, the improvement which comprises: a sleeve and a plug disposed within said valve, said sleeve and said plug being coaxially disposed in register with each other, each of said sleeve and said plug being tapered in a generally conical shape so that fluid passing from said inlet passes over the portion of least circumference towards the portion of greatest circumference; a valve seat disposed upon said plug nearest to said inlet and a cooperating flange disposed upon said sleeve, said flange and said seat each being arranged at substantially similar angular relationships to each other; a plurality of sharp edged tapered fins disposed upon each of the outer surface of said plug and the inner surface of said sleeve, the upper and lower surfaces of said fins being linear; the slope of said valve seat being substantially greater than the slope of the distal edges of said fins.

10. A valve comprising a fixed part and a tapered adjustable part, said tapered adjustable part being disposed in register within said fixed part, a plurality of spaced tapered fins disposed on said fixed part and said adjustable part, the upper and lower surfaces of each of said fins being linear, said fixed part and said adjustable part forming a flow passage between them when said valve is open, the spaces defined by adjacent fins on each of said parts diverging toward said flow passage, the depths of said spaces from the edges of said fins being at least one-half the width of said flow passage when said valve is fully open, the peripheral edges of the fins being sufficiently angularly inclined to the upper surface of the succeeding fin whereby fluid impinging on said edges is directed toward and into the succeeding chamber.

References Cited

UNITED STATES PATENTS

| 1,754,138 | 4/1930 | Ages | 251—121 |
| 1,919,232 | 7/1933 | Lee | 251—122 |
| 1,919,233 | 7/1933 | Lee | 251—122 |
| 1,968,779 | 7/1934 | Johnsen | 251—122 |
| 2,649,273 | 8/1953 | Honegger | 251—122 |

FOREIGN PATENTS

| 592,870 | 3/1959 | Italy. |
| 1,053,263 | 3/1959 | Germany. |
| 1,261,398 | 4/1961 | France. |

M. CARY NELSON, *Primary Examiner.*

S. SCOTT, *Assistant Examiner.*